(12) United States Patent
Orlowski et al.

(10) Patent No.: US 7,839,294 B2
(45) Date of Patent: Nov. 23, 2010

(54) BEARING MONITORING METHOD

(75) Inventors: David C. Orlowski, Punta Gorda, FL (US); Neil F. Hoehle, Salon, IA (US)

(73) Assignee: Inpro/Seal, LLC, Rock Island, IL (US)

( * ) Notice: Subject to any disclaimer, the term of this patent is extended or adjusted under 35 U.S.C. 154(b) by 0 days.

(21) Appl. No.: 12/335,218

(22) Filed: Dec. 15, 2008

(65) Prior Publication Data
US 2009/0096627 A1  Apr. 16, 2009

Related U.S. Application Data

(63) Continuation of application No. 11/881,881, filed on Jul. 30, 2007, now abandoned.

(60) Provisional application No. 60/842,718, filed on Sep. 7, 2006.

(51) Int. Cl.
G08B 21/00 (2006.01)

(52) U.S. Cl. ............. 340/682; 340/679; 340/683; 340/686.3; 340/686.4

(58) Field of Classification Search ............. None
See application file for complete search history.

(56) References Cited

U.S. PATENT DOCUMENTS

| | | | |
|---|---|---|---|
| 4,484,754 A | 11/1984 | Ballard | |
| 5,290,047 A * | 3/1994 | Duffee et al. | 277/419 |
| 5,470,157 A | 11/1995 | Dougherty et al. | |
| 5,509,310 A * | 4/1996 | El-Ibiary | 73/660 |
| 5,655,642 A | 8/1997 | Lawrence et al. | |
| 5,752,294 A | 5/1998 | Mor | |
| 6,008,556 A * | 12/1999 | Ramthun | 310/88 |
| 6,080,982 A * | 6/2000 | Cohen | 250/227.11 |
| 6,114,966 A * | 9/2000 | Eguchi | 340/682 |
| 6,148,986 A | 11/2000 | Brink et al. | |
| 6,209,702 B1 | 4/2001 | Agnoff | |
| 6,234,489 B1 | 5/2001 | Orlowski et al. | |
| 6,331,823 B1 * | 12/2001 | El-Ibiary | 340/870.16 |
| 6,445,099 B1 * | 9/2002 | Roseman | 310/90 |
| 6,471,215 B1 * | 10/2002 | Drago et al. | 277/412 |
| 6,535,135 B1 * | 3/2003 | French et al. | 340/682 |
| 7,052,014 B1 | 5/2006 | Orlowski et al. | |
| 7,090,403 B2 | 8/2006 | Orlowski et al. | |
| 7,396,017 B2 | 7/2008 | Orlowski et al. | |
| 2001/0002742 A1 * | 6/2001 | Orlowski | 277/361 |
| 2001/0039835 A1 | 11/2001 | Scholl et al. | |
| 2003/0235354 A1 * | 12/2003 | Orlowski et al. | 384/192 |
| 2006/0019578 A1 * | 1/2006 | Yamane et al. | 451/8 |

(Continued)

FOREIGN PATENT DOCUMENTS

WO  WO 2004/045127  5/2004

*Primary Examiner*—Julie Lieu
(74) *Attorney, Agent, or Firm*—Hamilton IP Law, PC.; Jay R. Hamilton; Charles A. Damschen

(57) ABSTRACT

A method for monitoring a bearing is disclosed. The method involves positioning a non-contacting bearing isolator adjacent a bearing on a piece of rotating equipment so that at least one operating parameter of said bearing is communicated to said bearing isolator; and, positioning an energy detector within range of said bearing isolator so that said energy detector is able to monitor said at least one operating parameter of said bearing by detecting at least one operating parameter of said bearing isolator.

10 Claims, 16 Drawing Sheets

U.S. PATENT DOCUMENTS

2006/0170551 A1*  8/2006  Nakamura et al. ....... 340/572.1
2007/0118333 A1*  5/2007  Miyasaka et al. ........... 702/183
2007/0152107 A1*  7/2007  LeFebvre et al. ........ 246/169 R

* cited by examiner

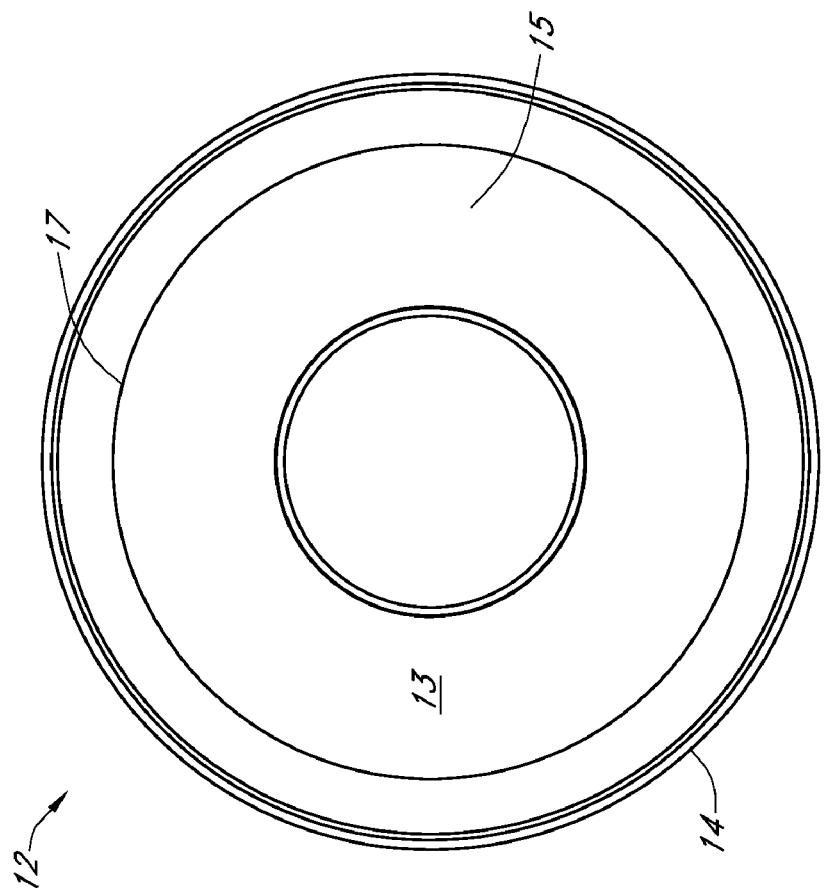
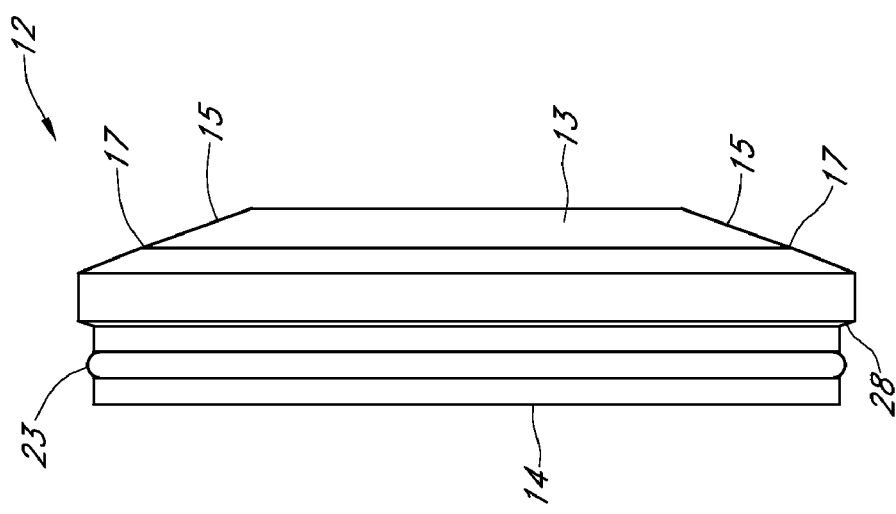
FIG. 4B
FIG. 4A

BEARING MONITORING METHOD

CROSS REFERENCE TO RELATED APPLICATIONS

This application is a continuation of U.S. patent application Ser. No. 11/881,881 filed on Jul. 30, 2007 now abandoned, from which Applicant claims priority, and which prior application claimed priority from Provisional U.S. Pat. App. Ser. No. 60/842,718 filed on Sep. 7, 2006, all of which are incorporated by reference herein.

FIELD OF INVENTION

The present invention relates to both an improved bearing isolator that may be used alone or in combination with a conveyor roller type arrangement for improved contaminant exclusion in industrial applications and an improved monitoring method and system allowed by said apparatus. When the improved bearing isolator is used in combination with a conveyor roller, the exterior end face of the improved bearing isolator provides an indicator surface for monitoring.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND OF THE INVENTION

Conveyors all over the world are in constant use handling a wide variety of usually solid materials that are in need of being transferred from one point to another. Materials include, but are not limited to, coal, sand, rocks, steeped corn, packages, and mined ores. Alternative means to conveyors for transporting solid materials include trucks or other vehicles, or conversion of the material to a slurry so that it may be pumped from one place to another.

Conveyors handling bulk solids such as coal or ores can extend across mountainous terrain, over roads and streams for many miles. These conveyors are made up of belts that are normally supported by three rollers positioned at the bottom and sides of the belt. One roller is usually horizontal and the two side rollers are at an angle of approximately 35 degrees from the horizontal plane.

Typically, the three rollers are supported by a frame that engages the shaft ends of the rollers (which shaft is generally concentric with the roller and of a slightly larger axial dimension than the roller) so as to keep the roller assemblies in line and in position for accommodating the belt and its load. The frames are normally positioned three feet or one meter from each other in a line, which equates to approximately 1,760 sets of three rollers per mile of conveyor run, or 1,100 sets per kilometer. Accounting for two bearing and bearing seals per roller, this approximation yields 10,560 bearings and bearing seals per mile of conveyor. Any one of the seals or bearings could severely degrade and cause the system to shut down. A stalled roller may put undue strain on the belt being used for holding the product, and when a bearing grinds to a halt, the resulting heat produced from the increased friction may initiate combustion of various combustible materials in and around the bearing location.

Rollers of the prior art are normally fitted with sealed bearings at either end. Sealed bearings have integral rubber sealing components on either side of the inner and outer race that contact the inner race in a frictional manner, often with a lubricant packed between the inner and outer races. At the axial extremity of the roller, rubber or composite seals are applied so as to protect the sealed bearings from dust, dirt, silicon or other foreign matter that may contaminate the bearings and their lubricant. The seals, so described, are of the contacting type and frictionally engaged with the stationary component of the roller, which is usually the stationary shaft, or the stationary seal component. As soon as wear occurs, sealing efficiency degrades so as to be completely ineffective. Reliability of the system suffers because of the very large number (as calculated above) of wearing and vulnerable components. The prior art contacting seals are prone to wear and are energy consumptive because of the frictional drag inherent in their design. This frictional drag increases the operating costs through increased maintenance and electrical energy costs; therefore, reliability and energy consumption must be addressed and are two of the integral and useful subjects of this invention. FIG. 1A presents an exploded view of a conveyor roller bearing arrangement known to those practiced in the art.

As taught by the prior art, conveyor rollers of this type are particularly suited to conveyors that operate in very difficult conditions. Typical environmentally difficult applications are mines, cement works, coal-fired electric utilities and dock installations, among others. The roller sealing system, as taught by the prior art, is designed to solve problems associated with the environmental challenges of dust, dirt, water, or other contaminants, low and high temperatures, or applications where a large temperature imbalance between day and night may be present. The principal task of the seals of the prior art used in conveyor rollers is to protect the primary bearing from harmful elements that may interfere with the primary bearing or impinge from the outside or the inside of the conveyor roller system and damage or shorten the useable life of the primary bearing. As found by applicant, the prior art fails to achieve the objective.

Given the large numbers of conveyor rollers typically installed and used, it is difficult for operators to be alerted to a primary bearing failure until a secondary event occurs. Many times, this secondary event is initiation of a smoldering fire or smoke from conveyed materials deposited in close proximity to the conveyor due to the heat often generated from primary bearing failure. This heat generation that may cause a smoldering fire typically occurs from ferrous metal to ferrous metal contact, as does sparking, both of which are allowed by primary bearing failure. The typical bearing seal is hidden from external inspection/view and is made of plastic so that it does not only conduct heat poorly but is prone to fail upon rapid heating from either combustion or ferrous metal to ferrous metal contact. As is well known to those practiced in the art, ferrous metal to ferrous metal contact (rubbing) may be severe enough to raise the metal temperatures to 2500 degrees Fahrenheit (1370 degrees Celsius) and result in partial or full melting of the primary bearing and the destruction thereof. Furthermore, this source of heat may support ignition of conveyed materials, such as the carbon in coal, which has a temperature of ignition in the range of 765 degrees Fahrenheit (407 degrees Celsius), in contact with or exposed to the primary bearing.

SUMMARY OF THE INVENTION

It is an objective of the present art to claim and disclose an improvement on the prior art and present viable solutions to the disadvantages of the prior art, including increased reliability of and reduction of energy consumed by roller assemblies and conveyor systems of the prior art.

It is a further objective of the present art to claim and disclose a method of monitoring the improved bearing isolator in all its embodiments. In this method, the improved bearing isolator may be used as an indicator in connection with a detector system that collects operational data useful in operating the equipment associated with the improved bearing isolator and cooperatively engaged with the improved bearing isolator. The disclosed method may also be used for predictive and preventative maintenance of the improved bearing isolator and any equipment associated or systematically engaged therewith.

One embodiment of the present invention as illustrated in FIGS. 3, 4A-4C, 6, and 7 is a non-contacting, non-wearing, and non-energy consumptive sealing system that provides adequate protection for primary bearings as may be found in the prior art and particularly those primary bearings used in combination with conveyor roller bearings as found in the prior art. In a first embodiment of the present invention, the bearing seals of the conveyor rollers of the prior art may be replaced with the present art. In this first embodiment, the improved bearing isolator is a substitute for lube containment shields, and the improved bearing isolator will not wear or degrade in use. Since the roller housing rotates around a stationary shaft, high quality and long lasting grease lubricant centrifugates (i.e., migrates through and by centrifugal acceleration) during rotation to the inner track of the outer race of the primary bearing and interacts with the rolling components of the primary bearings. In the embodiments disclosed, at all times there will be no frictional engagement with the sealing components or the improved bearing isolator assemblies.

The new conveyor roller and improved bearing isolator have numerous advantages over the prior art, including substantially lower friction operation. This reduction in friction lowers energy required to operate a conveyor. Another advantage is improved contaminant exclusion. The improved bearing isolator portion of the conveyor roller has a massive intermediate annular chamber that accumulates granular material (or other external contaminants) attempting to infiltrate the primary bearing of the conveyor roller. This internal intermediate chamber limits the passage of the granular material that is present in the conveyed loads into the primary bearing. The design as disclosed is not limited to a single intermediate annular chamber, but extends to conveyor rollers and improved bearing isolators with a plurality of intermediate annular chambers since it is possible to position more than one of the intermediate annular chambers within the improved bearing isolator. The intermediate annular chamber (s) interrupt the interface passage between the stationary and rotating elements of the improved bearing isolator and have specifically designed entrance and exit locations for contaminants. In one embodiment, the interface passage entrance to the intermediate annular chamber is at the upper quartile of the intermediate annular chamber. The interface passage may exit the intermediate annular chamber at the lower quartile of the intermediate annular chamber. As a result, passage of the contaminants into the primary bearing will be counter to the flow of possible contaminants (which is inward to outward) because of the centrifugal force due to the orientation of increasing diameters in the improved bearing isolator. When handling dry powders, the intermediate chambers will not have a hydraulic ram effect as would be the case with liquids. Other embodiments exist in which the interface passage may exit the intermediate annular chamber in another area of the intermediate annular chamber, and the specific orientation of the interface passage with respect to the intermediate annular chamber in no way limits the scope of the present invention.

The improved bearing isolator portion of the conveyor roller is designed with a long and tortuous passage in the interface between the stationary (stator) and rotating (rotor) components of the bearing isolation seal, which is the subject of this disclosure. FIGS. 3A-3D provide simple illustrations of various orientations of entrance and exit locations to and from the intermediate chamber that may be employed in the present invention without departure from the spirit and intent of the invention. Further variations and modifications on the entrance and exit locations to and from the intermediate chamber and to the passage in the interface between the stator and rotor will occur to those of ordinary skill in the art without departure from the spirit and scope of the invention.

As shown in the accompanying figures, the interface between the stator and the rotor may be selected so that various portions of the interface between the stator and rotor form a circumferential annular channel transverse the axial direction of the shaft and other portions of the interface form a circumferential annular channel parallel the axial direction of the shaft.

The passage between the stator and the rotor will include a series of ninety degree turns that will prohibit free flow of the possible contaminants into the bearing environment. The embodiment of the present invention illustrated in FIGS. 3, 4A-4C, 6, and 7 has nine of the prescribed ninety degree turns. It is contemplated more or less turns may be incorporated in the design as disclosed as necessitated by operating conditions without departing from the spirit or intent of the present art. During operation, the intermediate annular chamber may be filled with long-lasting, preferably synthetic, grease, as known to those practiced in the art. As is known to those skilled in the art, the grease may be filled at the time of initial assembly or after initial assembly by an external zerk fitting employing a passage from the external surface of the stator into the intermediate annular chamber.

In most embodiments, the passage between the rotor and stator will have constantly increasing diameters from the inside of the improved bearing isolator to the outside of the improved bearing isolator to discourage flow of granular material or contaminants in the direction towards the primary bearing. That is, the design as disclosed promotes outward contaminant flow as previously described. As disclosed, the end face angle relative to the horizontal may be steeper and more severe than the angle of repose that exists with the conveyed material.

The entrance to the exterior interface passage may be angled with respect to the axis of the conveyor roller so as to deflect water spray and to not offer a surface for direct impingement of external contaminants to the exterior interface passage entrance. The angled end face also increases surface area available for thermal detection by external monitoring systems, as will be described in further detail herein.

The rotor and stator may be unitized by a VBX ring or other snap lock type design as is the method of Inpro/Seal prior art as claimed and disclosed in U.S. Pat. No. 6,419,233. The design as disclosed will accommodate arrangement and combination of the improved conveyor roller and/or improved bearing isolator with double-shielded bearings rather than sealed bearings for superior and long-lasting lubrication of the bearings. This is an advantage because shielded bearings do not experience frictional engagement between the inner and outer races of the bearing, which increases operating efficiencies and reduces energy consumption during operation.

As disclosed herein, the improved bearing isolator is a further improvement upon the prior art conveyor roller bearing seals because the improved bearing isolator may act as a secondary sleeve or journal bearing assembly to the primary bearing in the event the primary rolling element bearing should fail and collapse. The angled exterior end face of the improved bearing isolator increases internal axial surface area available between the rotor and stator of the conveyor roller bearing seal. The improved bearing isolator will serve as an emergency sleeve-type bearing for a limited time and prevent overheating of the failed primary bearing. However, unmonitored operation in this mode is not recommended, and in the event of primary bearing failure it is recommended that the primary bearing be replaced as soon as possible. During temporary operation as an emergency sleeve or journal bearing, the ensuing heat conducted from the primary bearing to the improved bearing isolator may liquefy the stored grease; thereby allowing the grease to lubricate the rubbing surfaces along the interface passage of the improved bearing isolator. This lubrication during emergency operation should greatly extend the useful life of the improved bearing isolator. Again, unmonitored operation in this mode is not recommended.

During the emergency-type service of the improved bearing isolator described above, less heat is produced than otherwise would occur using conveyor bearing seals of the prior art because the improved bearing isolator acts as a secondary bearing, thereby reducing the frictional load on the primary bearing and prohibiting heat produced from ferrous metal to ferrous metal contact. Furthermore, the heat produced by the improved bearing isolator, when acting as an emergency sleeve bearing, will be conducted to the outer portions of the improved bearing isolator and the exterior of the conveyor itself, which is typically positioned at a location exterior to the primary bearing and conveyor roller. Conduction to the outer surfaces will allow some heat dissipation caused by primary bearing failure and may provide operators with a means for earlier detection of abnormal operating conditions. If the intermediate annular chamber has been filled with grease, liquefaction of the grease will also dissipate a portion of the heat produced. This heat conduction occurs because the improved bearing isolator is composed of bronze rather than plastic, as is typical with most conveyor bearing seals.

A further advantage of the present art is that if the improved bearing isolator is made from a non-ferrous metal, such as bronze, and therefore contact between the improved bearing isolator and ferrous elements such as ferrous components of the conveyor roller, the primary bearings, or the roller frame will not produce an ignition source (i.e., no sparks will result), which inhibits combustion. As is well known to those practiced in the arts, primary bearing failure in an environment with combustible conveyed materials, such as coal, can lead to ignition and fire. It should be noted that although bronze is a preferred non-ferrous metal, in other embodiments of the present art, non-sparking metals other than bronze may be chosen for their non-ferrous qualities such as gold, silver, nickel, copper, and combinations thereof.

Finally, it is another advantage of the invention and the intent of the inventor to disclose and claim a method of utilizing a monitoring system, which are well known to those practiced in the art, in combination with the improved bearing isolator and improved conveyor roller arrangement. In the method, the monitoring system is located externally of the conveyor and any elements thereof, and upon installation, the failure of the primary bearing may be detected based on the increased temperature of the improved bearing isolator, and an alert may be observed by the conveyor operator before an unsafe situation arises. During service as an emergency secondary bearing, the improved bearing isolator may also provide notice of the failure of the primary bearing. The improved bearing isolator angled end face serves as an improved indicator of the emergency situation using any number of monitoring means, including thermal detection by external monitoring systems. Thermal detection means could be as simple as direct operator inspection of the improved bearing isolator (i.e., physical contact with the improved bearing isolator to detect whether the external surface temperature of the improved bearing isolator has increased), or use by an operator of a hand-held thermal imager or infrared ("IR") camera, which are well known to those in the art as found in products offered by Fluke Corporation and FLIR Systems, respectively, and as taught by U.S. Patent Applications having publication number 20060152737 for "Method and Apparatus for Electronically Generating an Outline Indicating the Size of an Energy Zone Imaged onto the IR Detector of a Radiometer" and publication number 20040196372 for "IR Camera," both of which are incorporated by reference herein.

Another embodiment as disclosed and claimed herein provides for a networked system of at least one thermal scanner or IR camera positioned around the conveyer system to pan and scan (i.e., continually move back and forth in a predetermined, two- or three-dimensional path) the operational areas and detect thermal changes at the angled exterior end face areas of the improved bearing isolator, which serve as operation indicator surfaces.

In another embodiment of the present disclosure, the improved bearing isolator may be fitted with a transducer port or electrode for interconnectivity with a digital linear heat detection system as well known to those in the art and found in U.S. Pat. No. 4,647,710 issued to Davis for "Heat Sensitive Cable and Method of Making Same," which is incorporated herein by reference.

BRIEF DESCRIPTION OF THE FIGURES

FIG. 4A provides a side view of the improved bearing isolator disclosed herein.

FIG. 4B provides a front view of the improved bearing isolator disclosed herein.

| ELEMENT DESCRIPTION | ELEMENT NUMBER |
| --- | --- |
| Conveyor roller shell | 1 |
| Shaft | 2 |
| Bearing Housing | 3 |
| Inner Seal | 4 |
| Primary Bearing | 5 |
| Labyrinth Seal | 6 |
| Circlip | 7 |
| Cover | 8A |
| Stone guard | 8B |
| Weather seal | 9 |
| Improved bearing isolator | 12 |
| Stator | 13 |
| Rotor | 14 |
| Stator exterior end face | 15 |
| Rotor interior end face | 16 |
| Exterior interface passage | 17 |
| Interior interface passage | 18 |
| Intermediate annular chamber | 19 |
| Immediate interface passage | 20 |
| Rotor uniting ring groove | 21 |
| Stator unitizing ring groove | 22 |
| O-ring | 23 |
| Rotor O-ring groove | 24 |
| First stator O-ring groove | 25 |
| Axial engagement surface area | 26 |
| Second stator O-ring groove | 27 |
| Ramped shoulder | 28 |
| Axial interface passage | 29 |
| Inner side of stator | 30 |
| Inner side of rotor | 31 |
| Unitizing ring | 32 |
| Inner bearing race | 35 |
| Outer bearing race | 36 |
| Primary bearing shield | 38 |
| Primary bearing seal | 39 |
| Conveyor roller | 40 |
| Polyurethane structure | 41 |
| Thermal scanner | 42 |
| IR camera | 43 |
| Sensor port | 44 |

| ELEMENT DESCRIPTION | ELEMENT NUMBER |
| --- | --- |
| Grease zerk | 45 |
| Grease passage | 46 |
| Line of sight | 48 |

DETAILED DESCRIPTION

Figure 1:
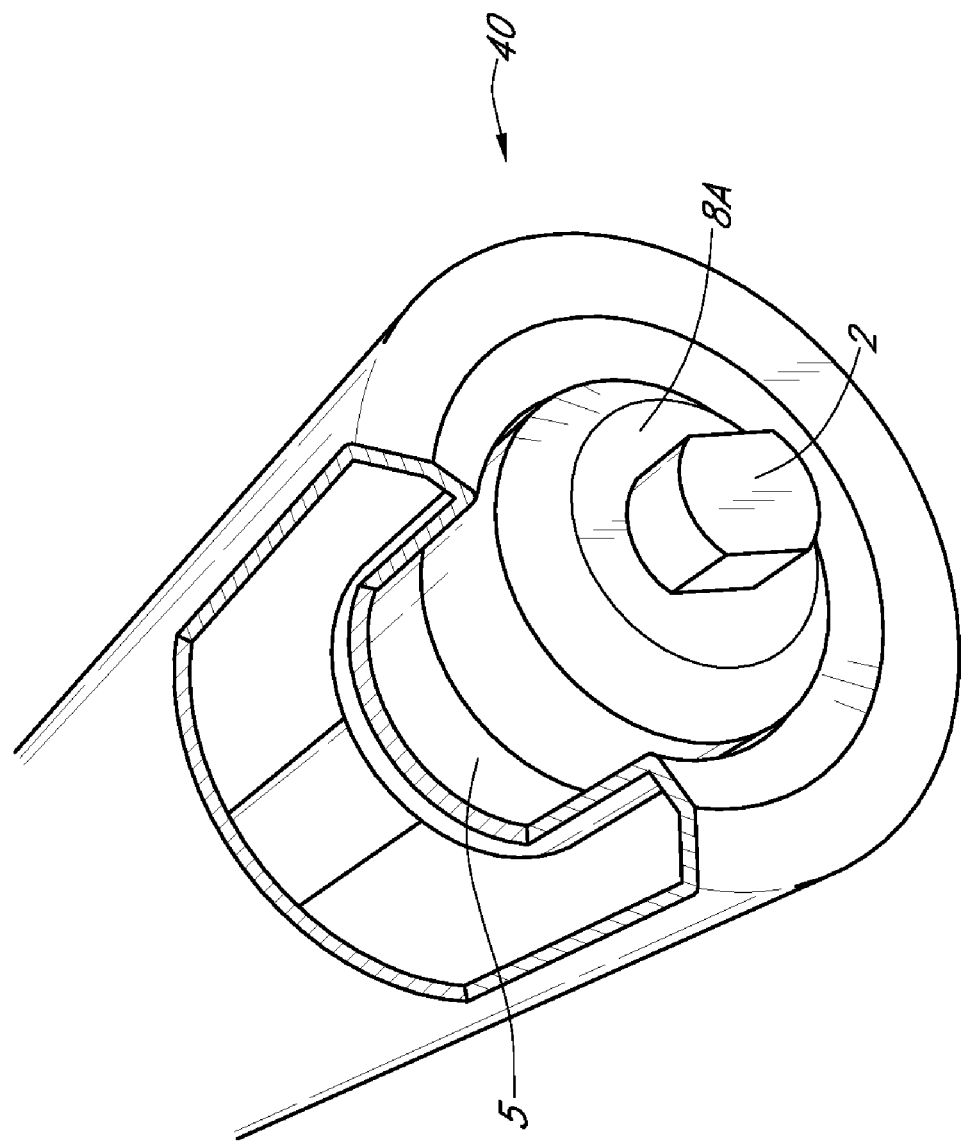
FIG. 1 is a sectional view of a conveyor roller and primary bearing assembly as found in the prior art.
Figure 1A:
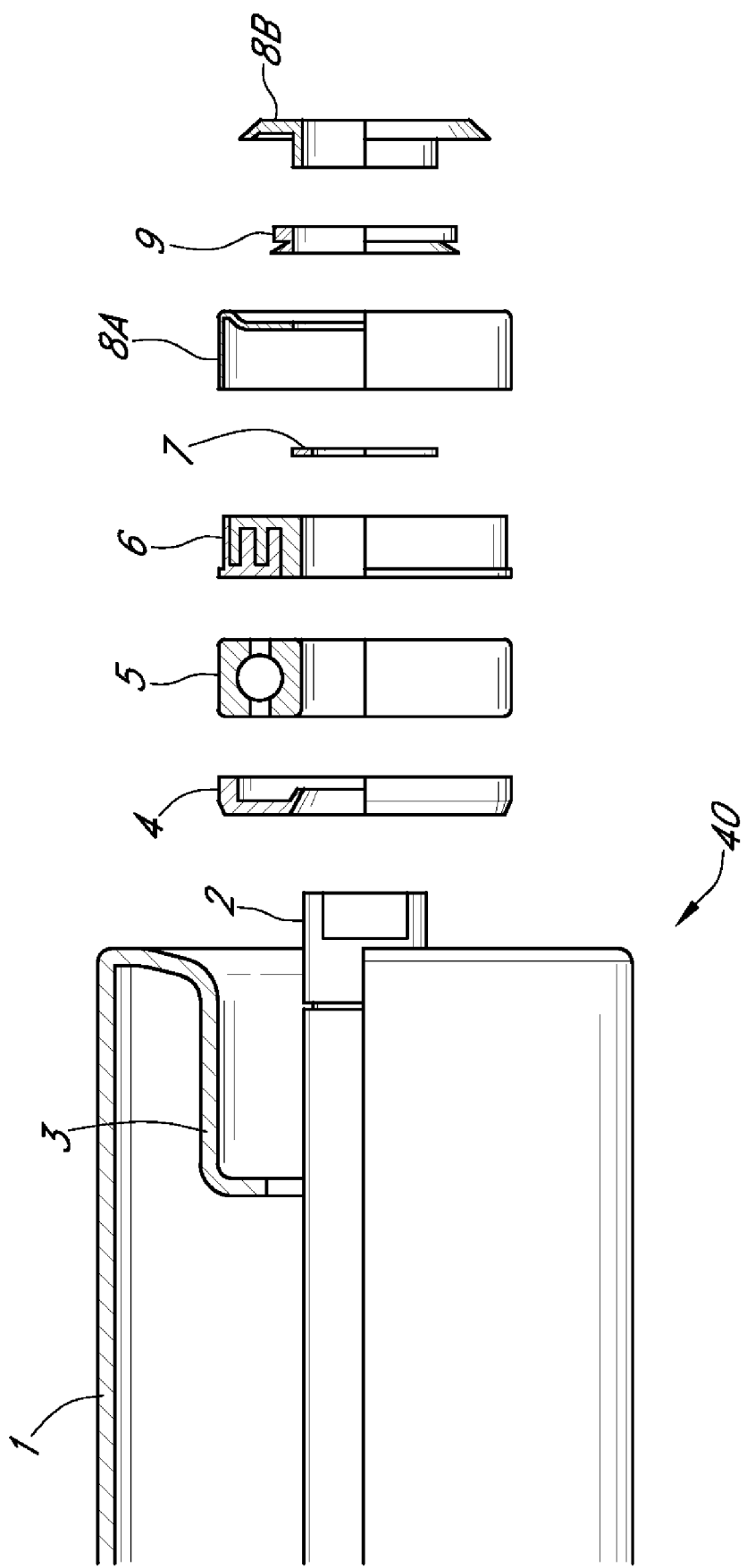
FIG. 1A is an exploded, side view of the conveyor roller and primary bearing assembly of the prior art shown in FIG. 1.

FIGS. 1 and 1A illustrate the prior art as taught by U.S. Pat. No. 6,802,410 issued to Dyson et al. for "Conveyor Roller Bearing Housing," which is incorporated by reference herein.

There are two principal sections shown in FIGS. 1 and 1A of the prior art bearing assembly; one external and one internal. The external section is comprised of a cover 8A and stone guard 8B. As taught by the prior art, the design of the cover 8A and stone guard 8B and the shape of the bearing housing 3, are intended to be self-cleaning when rotating (i.e., centrifugally expel all pollutants). Applicant has not found this to be the case.

As illustrated in FIG. 1 and 1A, the internal section is typically comprised of a triple lip labyrinth seal 6 (sometimes referred to as a lip ring), often made of nylon PA6, which is greased to give further primary bearing 5 protection. In other applications, the labyrinth seal 6 is made from soft, anti-abrasive rubber with a large contact surface that provides an ineffective hermetic seal, which thereby reduces the working life of the seal. Behind the primary bearing 5 is an inner seal 4, also composed of nylon PA6, to provide a grease reservoir and retain the grease near to the primary bearing 5 fixed to the shaft 2 even when there is a depression due to an abrupt change in temperature (which results in a pumping effect). This inner seal 4 is also intended to mitigate the eventual formation of condensation on, and oxidation of the shaft 2 and/or primary bearing 5, which normally takes place inside the tube-like structure of the conveyor roller shell 1 due to failure of the bearing seal arrangement. The seal locking system is provided for by circlips 7, which are also known as a snap rings by those practiced in the art.

Figure 2:
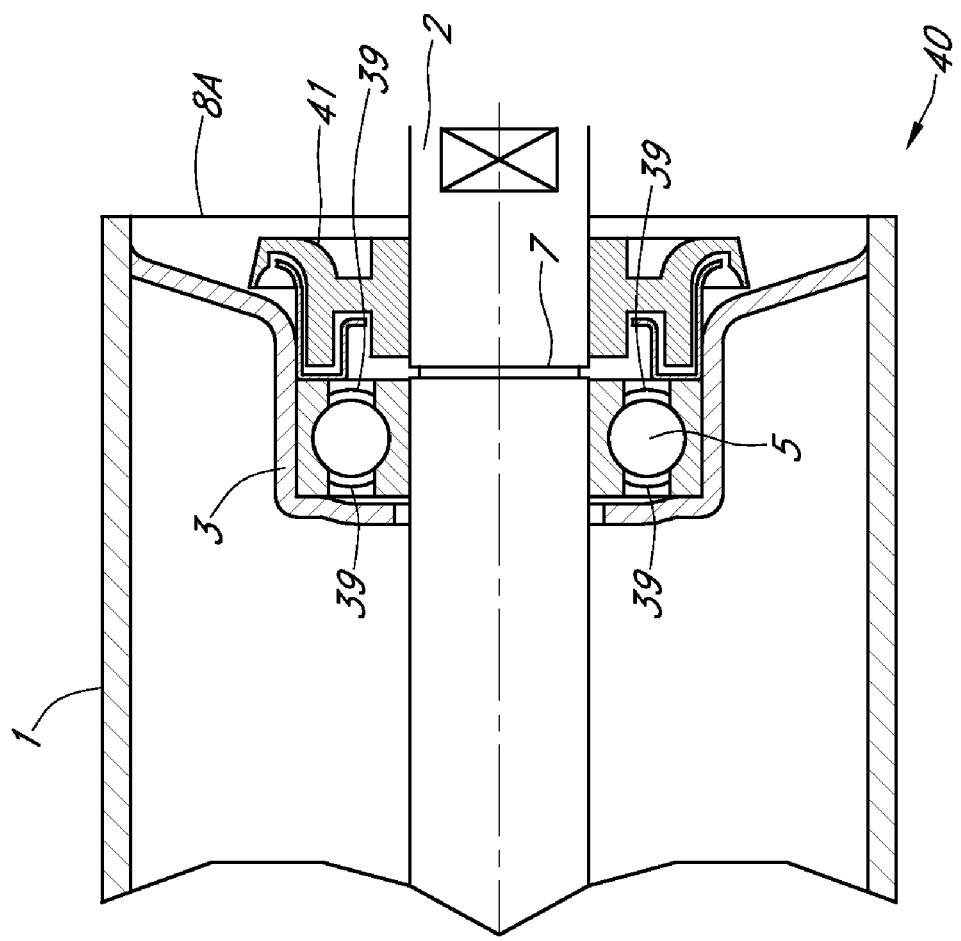
FIG. 2 is a side view of another conveyor roller and bearing assembly as found in the prior art.

FIG. 2 illustrates another conveyor roller 40, shaft 2, and primary bearing 5 combination as taught by the prior art. This combination suffers from similar weaknesses as the configuration shown in FIGS. 1 and 1A. In the embodiment shown in FIG. 2, the primary bearing 5 is of the sealed type, and as with the embodiment shown in FIGS. 1 and 1A, the primary bearing 5 is positioned within the conveyor roller 40, with the outer bearing race 36 secured to the bearing housing 3 and the inner bearing race 35 secured the shaft 2. The primary bearing 5 is protected from exterior contaminants with a polyurethane structure 41. In the event of deterioration or seizing of the primary bearing 5, which is a common problem in most applications using conveyors, the heat produced from increased friction will rapidly degrade the polyurethane structure 41, thereby increasing the potential for ferrous metal to metal contact between the primary bearing 5, shaft 2, and conveyor roller 40. The increase in potential for ferrous metal to metal contact promotes spark production, creating a potentially dangerous situation.

Figure 3:
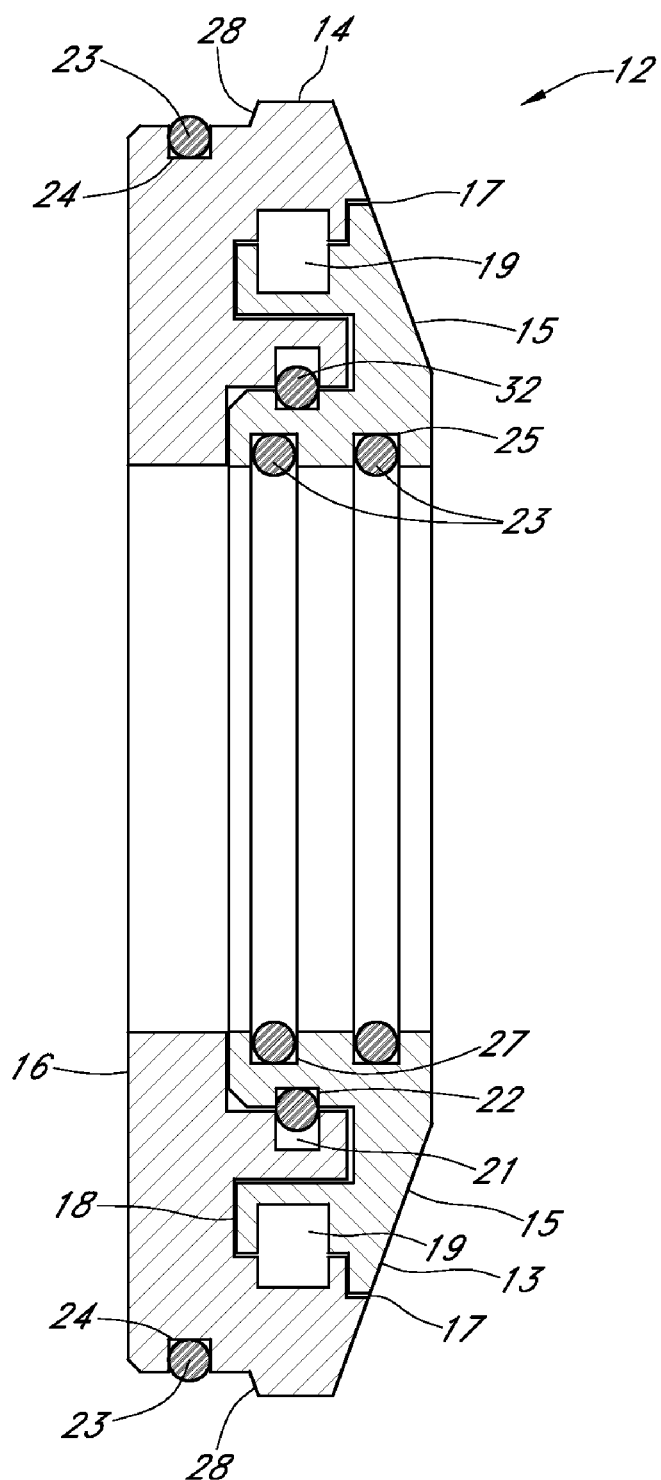
FIG. 3 is a cross-sectional view of a first embodiment of the improved bearing isolator of the present art.

FIG. 3 presents an embodiment of the present art. The primary bearing 5 is secured to the conveyor roller 40 and the shaft 2 in the same manner as are the prior art embodiments shown in FIGS. 1-2, or any other method known to those skilled in the art. For example, the present design as disclosed may be installed with a blunt, wide area set screw for maximum engagement with the surface of the shaft 2 to prevent and limit axial or rotational movement of the improved bearing isolator 12 or conveyor roller 40 with respect to the shaft. Furthermore, a hardened point set screw may be used to dimple engage the shaft 2 for assembly of the shaft 2 onto the frame (not shown) supporting the conveyor roller 40. In the embodiment shown in FIG. 3, the external entrance to the exterior interface passage 17 leading to the intermediate annular chamber 19 is parallel with the axial dimension of the shaft 2 and positioned nearly perpendicular to the exterior of the stator face 15.

In the embodiment shown in FIG. 3, the stator exterior end face 15 is angled with respect to the radial dimension of the shaft 2. The improved bearing isolator 12 is mounted on the shaft 2 axially distal from the primary bearing 5 in the conveyor roller 40, and is designed with a long and tortuous passage in the exterior interface passage 17, interior interface passage 18, and immediate interface passage 20 between the stator 13 (non-rotating portion of the improved bearing isolator 12) and rotor 14 (rotating portion of the improved bearing isolator 12), which passages cooperate to form a noncontacting labyrinth seal. The improved bearing isolator 12 shown in FIGS. 3, 4A-C, 6, 7, and 8 is a frictionless, non-contacting improved bearing isolator 12. That is, the rotor 14 rotates relative to the stator 13, but each interface between the stator 13 and the rotor 14 maintains a predetermined clearance under normal operating conditions. As shown in FIGS. 3, 4C, 6, and 7, the exterior interface passage 17, interior interface passage 18, and immediate interface passage 20 may have many angles and turns of varying orientation. Subsequently, the specific orientation of the angles or turns in the exterior interface passage 17, interior interface passage 18, intermediate annular channel 19, and immediate interface passage 20 in any particularly embodiment in no way limits the scope of the present invention. Furthermore, the improved bearing isolator 12 may be fashioned so that the external entrance to the exterior interface passage 17 and the portion of the exterior interface passage 17 adjacent the intermediate annular chamber 19, the portion of the immediate interface passage 20 adjacent the shaft 2 and the portion of the immediate interface passage 20 adjacent the unitizing ring 32, and the portion of the interior interface passage 18 adjacent the unitizing ring 32 and the portion of the interior interface passage 18 adjacent the intermediate annular chamber 19 are orientated along different angles with respect to the shaft 2 than the particular angles pictured herein without departing from the spirit and scope of the present invention.

As shown at FIGS. 3, 4C, 6, and 7, the stator 13 is affixed to the shaft 2 by at least one, and preferably a plurality, of O-rings 23 fit into first and second stator O-ring grooves 25 and 27, respectively. Those practiced in the art will appreciate that other means of affixation may be used without departure from the spirit and intent of this disclosure. Sealing qualities of the improved bearing isolator 12 during rotation of the shaft 2 and rotor 14 and at rest thereof may be further improved by insertion of unitizing ring 32 interrupting the interior interface passage 18 at a location between the intermediate annular chamber 19 and the shaft 2. At rest, the unitizing ring 32 seats in the stator unitizing ring groove 22 to seal the exterior interface passage 17, interior interface passage 18, and intermediate annular chamber 19 from the shaft 2 and immediate interface passage 20. During rotation, the unitizing ring 32 expands to seat in rotor unitizing ring groove 21, allowing contaminants in the interior interface passage 18, intermediate annular chamber 19, and/or exterior interface passage 17 to centrifugate (due to a number of increasing diameters in the radial dimension in the elements of the improved bearing isolator 12, which cause a pumping action in the direction of increasing diameters) towards the stator exterior end face 15 and out of the improved bearing isolator 12.

FIGS. 3A-3D provide simple illustrations of various orientations of entrance and/or exit locations (depending on whether the shaft 2 is stationary or rotating) to and from the intermediate annular chamber 19. When the shaft 2 is rotating, the exterior interface passage 17 serves as an exit from the intermediate annular chamber 19 for substances located between the exterior interface passage 17 and the unitizing ring 32; and the interior interface passage 18 serves as an entrance to the intermediate annular chamber 19 for such substances. When the shaft 2 is stationary, the interior interface passage 18 serves as an exit from the intermediate annular chamber 19 and the exterior interface passage 17 serves as an entrance into the intermediate annular chamber 19. These several orientations may be employed in the present disclosure without departure from the spirit and intent of the invention. Further modifications and variations to the entrances/exits described and disclosed herein will occur to those skilled in the art without departing from the spirit and scope of the present invention.

Figure 3A:
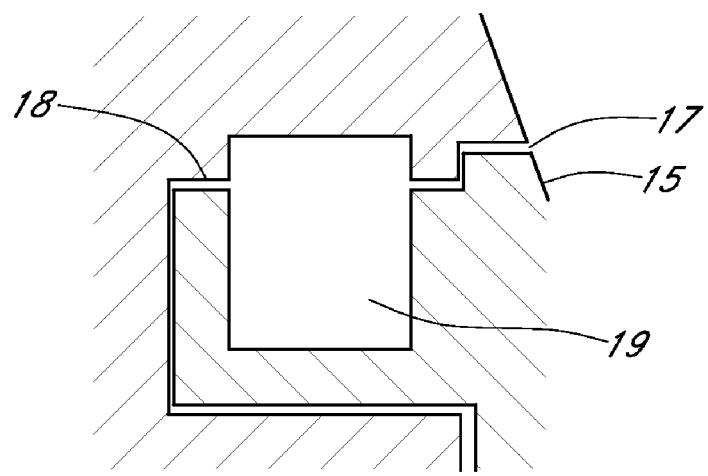
FIG. 3A provides a simplified view of the orientation of the interface passage shown in FIG. 3.

FIG. 3A illustrates an exterior interface passage 17 communicating with the intermediate annular chamber 19 in the first quartile of the intermediate annular chamber 19. At the junction of the intermediate annular chamber 19 and the exterior interface passage 17, the exterior interface passage 17 is parallel with the axis of the shaft 2. FIG. 3A also illustrates the interior interface passage 18 junction with the intermediate annular chamber 19, and further shows that junction may be positioned at the fourth quartile of the intermediate annular chamber 19.

Figure 3B:
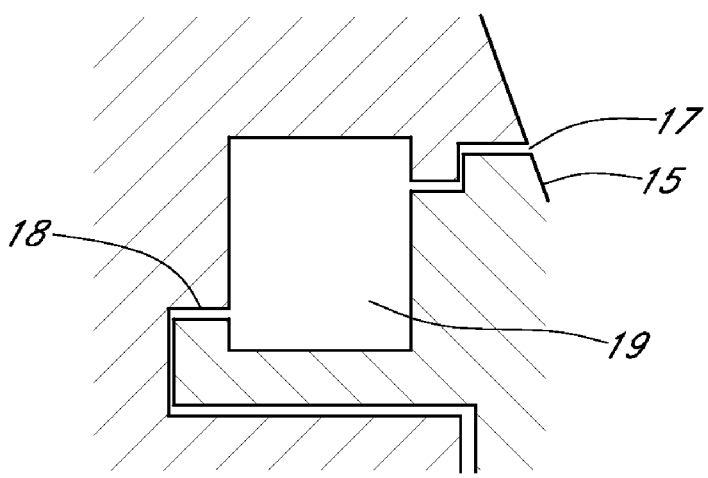
FIG. 3B provides a simplified view of another orientation of the interface passage shown in FIG. 3.

FIG. 3B illustrates an exterior interface passage 17 communicating with the intermediate annular chamber 19 in the first quartile of the intermediate annular chamber 19. At the junction of the intermediate annular chamber 19 and the exterior interface passage 17, the exterior interface passage 17 is parallel with the axis of the shaft 2, as it was in the embodiment shown in FIG. 3A. FIG. 3B also illustrates the interior interface passage 18 junction with the intermediate annular chamber 19, and shows that junction positioned at the third quartile of the intermediate annular chamber 19.

Figure 3C:
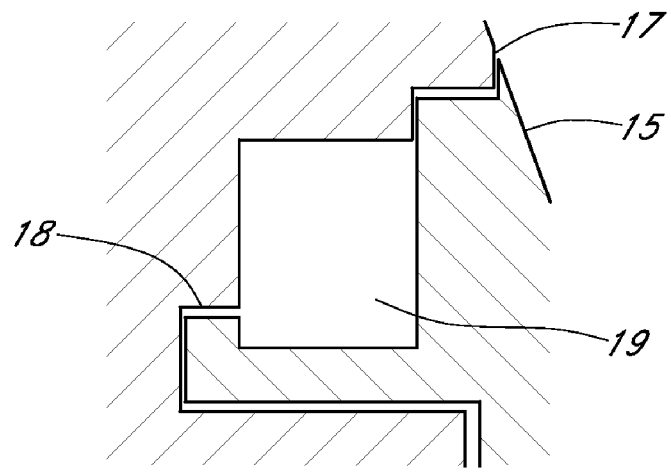
FIG. 3C provides a simplified view of another orientation of the interface passage shown in FIG. 3.

FIG. 3C illustrates an exterior interface passage 17 communicating with the intermediate annular chamber 19 in the first quartile of the intermediate annular chamber 19. At the junction of the intermediate annular chamber 19 and the exterior interface passage 17, the exterior interface passage 17 is oriented transversely from the axis of the shaft 2. FIG. 3C also illustrates the interior interface passage 18 junction with the intermediate annular chamber 19, and shows that junction positioned at the third quartile of the intermediate annular chamber 19.

Figure 3D:
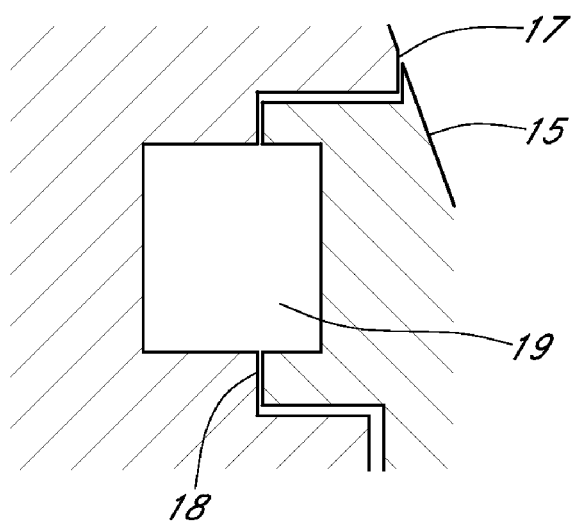
FIG. 3D provides a simplified view of another orientation of the interface passage shown in FIG. 3.
Figure 4C:
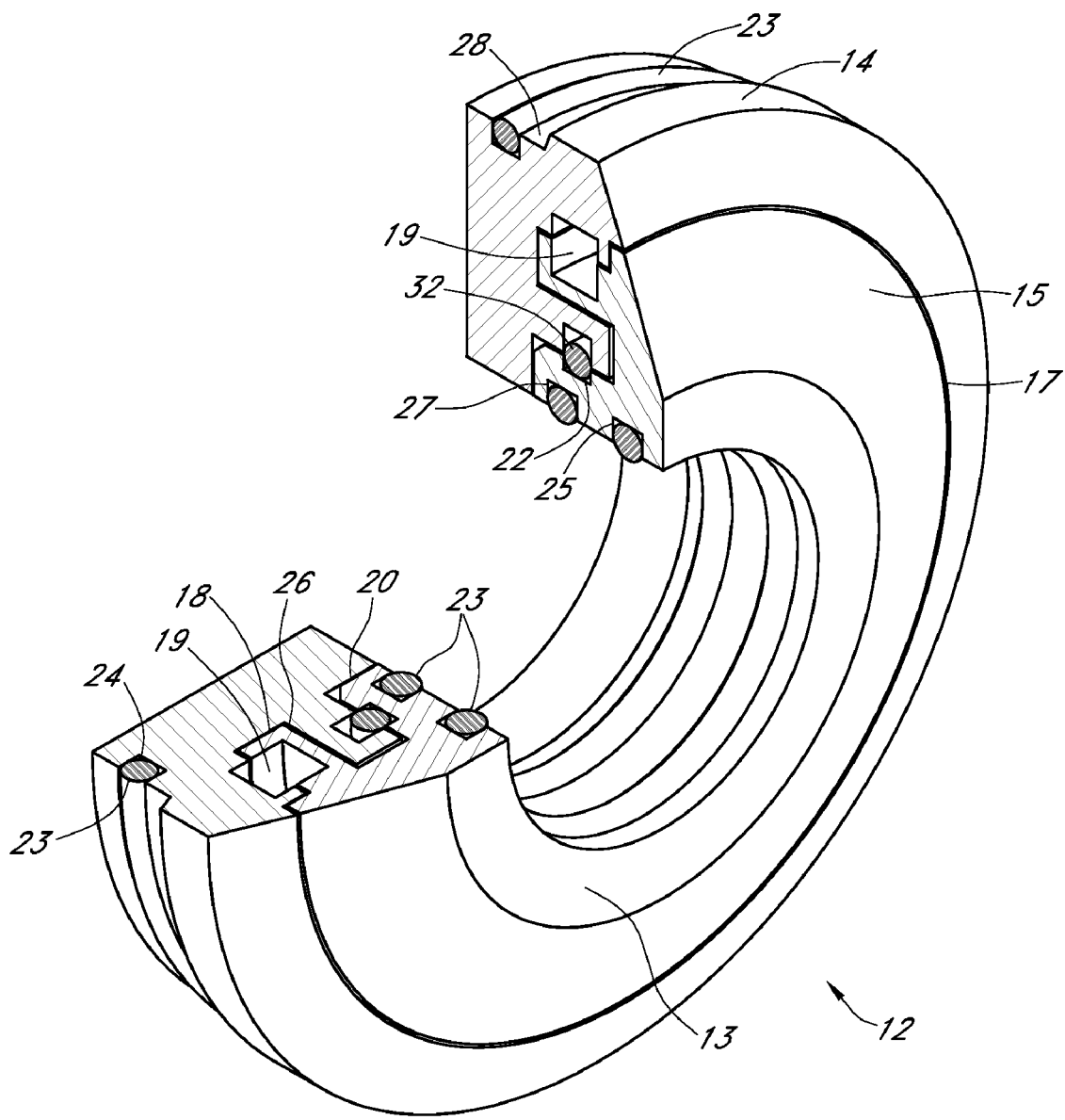
FIG. 4C provides a perspective, cut-away view of the improved bearing isolator disclosed herein.

FIG. 3D illustrates an exterior interface passage 17 communicating with the intermediate annular chamber 19 between the first and fourth quartiles of the intermediate annular chamber 19. At the junction of the intermediate annular chamber 19 and the exterior interface passage 17, the exterior interface passage 17 is oriented transversely from the axis of the shaft 2. FIG. 3D also illustrates the interior interface passage 18 junction with the intermediate annular chamber 19, and shows that junction positioned between the first and fourth quartiles of the intermediate annular chamber 19 and oriented transversely from the axis of the shaft 2.

Figure 6:
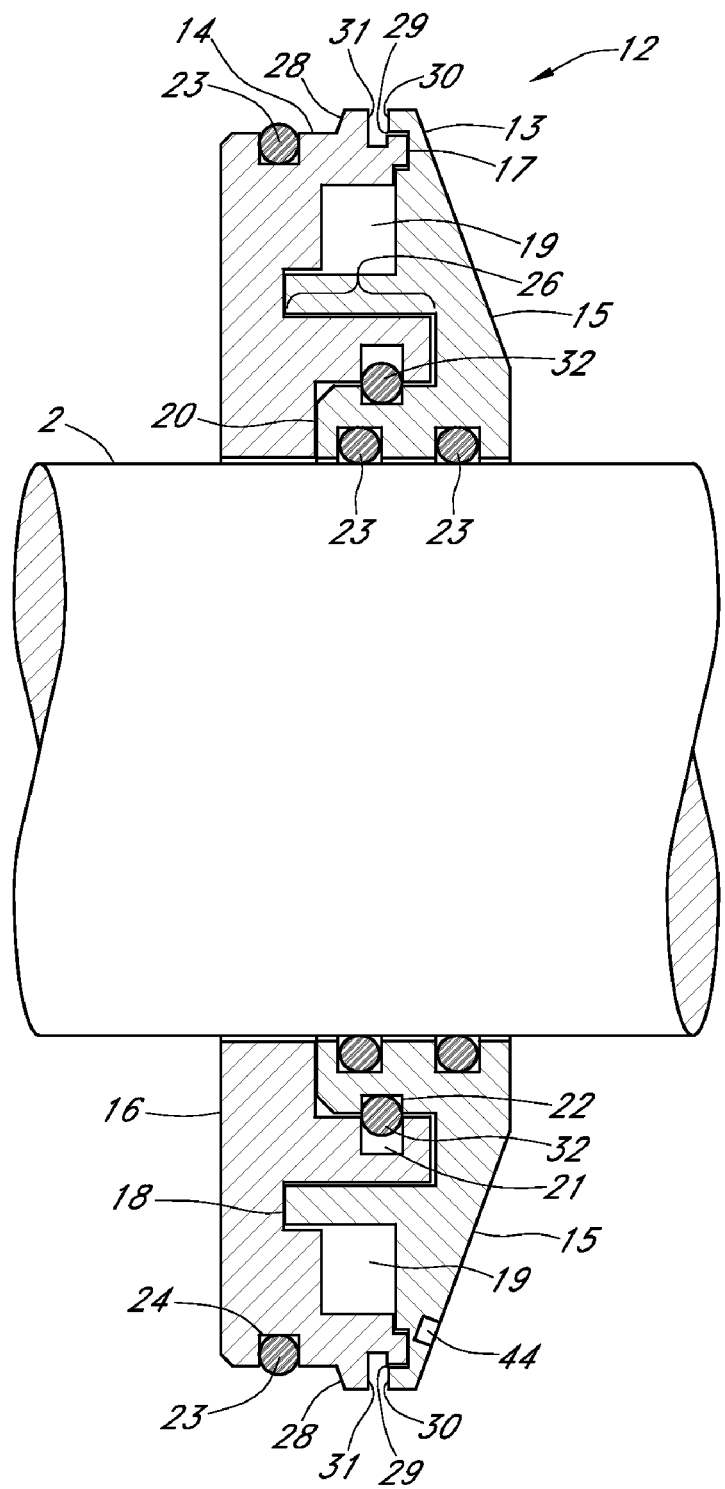
FIG. 6 provides a sectional view of another embodiment of the improved bearing isolator as disclosed herein.
Figure 7:
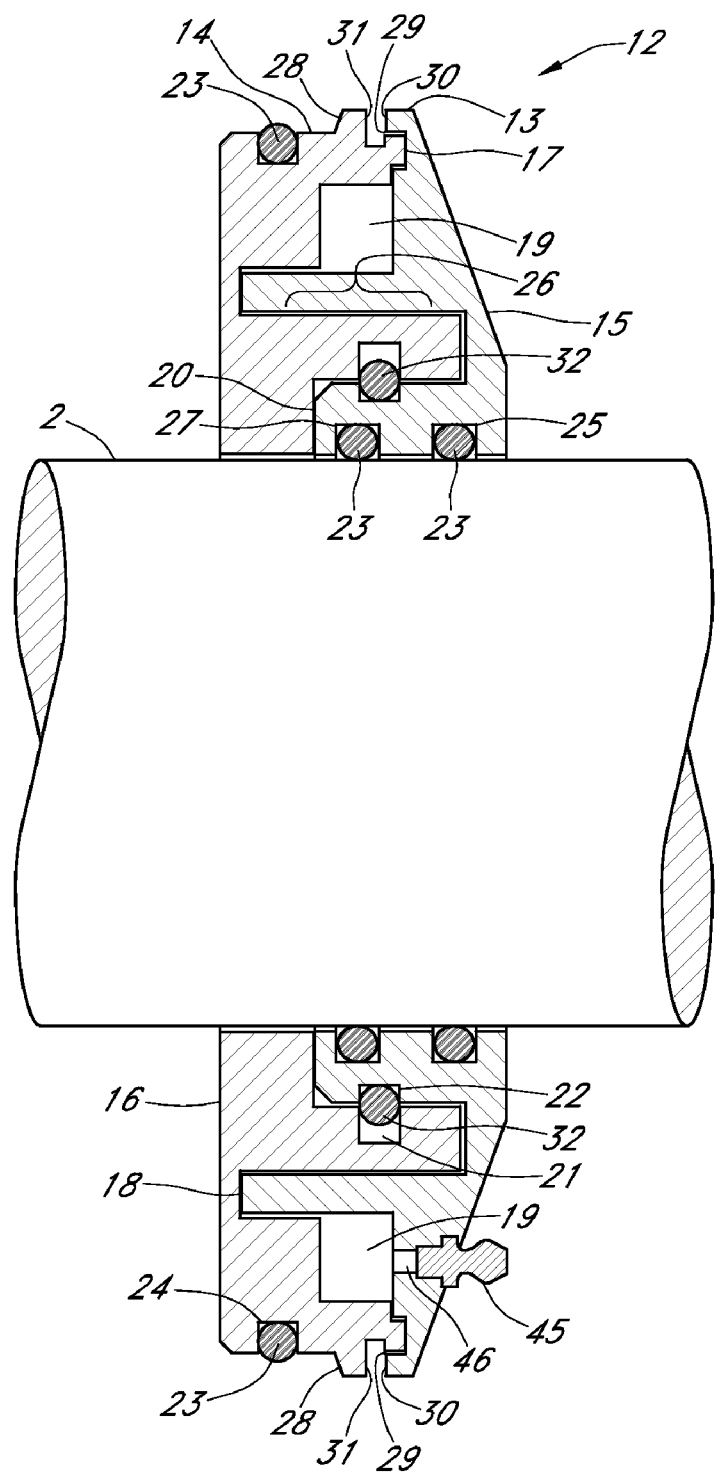
FIG. 7 provides a sectional view of another embodiment of the improved bearing isolator as disclosed, wherein the available axial engagement surface between the rotor and the stator has been enlarged.

As illustrated in FIGS. 6 and 7, the improved bearing isolator 12 is designed for sealing engagement between a shaft 2 and a bearing housing 3, and as noted previously, comprises a stator 13 and rotor 14. In this embodiment shown in FIGS. 3, 4A-C, 6, and 7 both the stator 13 and the rotor 14 surround the shaft 2. The rotor 14 is interference fit (sometimes referred to as a press fit) within a portion of the bearing housing 3 in the conveyor roller shell 1. The rotor 14 may be press fitted into the bearing housing 3 adjacent and axially distal from the primary bearing 5, as indicated in the embodiment shown in FIG. 8. Alternatively, in an embodiment not pictured herein, the rotor 14 could press fit into a separate portion of the conveyor roller shell 1 axially distal of the primary bearing 5 or other structure of the conveyor roller 40 located axially distal of the primary bearing 5 adapted to receive the rotor 14. An O-ring 23 seated in the rotor O-ring groove 24 in the periphery of the rotor 14 serves as a gasket, which seals the rotor interior end face 16 and the interior of the conveyor roller shell 1 from the exterior of the conveyor roller shell 1. The O-ring seated in the rotor O-ring groove 24 also serves to affix the rotor 14 to the conveyor roller shell 1 so that the rotor 14 is rotatable therewith. Selection of a metal, preferably bronze instead of plastic, as used by the prior art, allows an improved, secure fit and seal between the improved bearing isolator 12 and conveyor roller shell 1.

As illustrated in FIGS. 3, 4A-C, 6, and 7, the rotor 14 and stator 13 are cooperatively engaged and form an exterior interface passage 17, interior interface passage 18, intermediate annular chamber 19, and an immediate interface passage 20. The rotor 14 is designed for both engagement with (under certain operating conditions) and rotation within stator 13 at the exterior interface passage 17, interior interface passage 18, intermediate annular chamber 19, and immediate interface passage. Under typical operating conditions, the stator 13 and the rotor 14 do not come in contact with each other. These elements also serve as a conduit for inwardly and outwardly flowing contaminants to meet at the intermediate annular chamber 19 for both collection and outward flow away from the intermediate annular chamber 19 upon rotation of the rotor 14. Whether the contaminants are flowing inwardly or outwardly in an axial direction with respect to the primary bearing 5 will generally depend on whether the shaft 2 is rotating or stationary. When the shaft 2 is rotating, contaminants located in the exterior interface passage 17, interior interface passage 18, and intermediate annular chamber 19 will flow in an outwardly axial direction with respect to the primary bearing 5, eventually exiting the improved bearing isolator 12 through the exterior interface passage 17 to an environment external to the improved bearing isolator 12. When the shaft 2 is stationary, contaminants located in the exterior interface passage 17 will gather in the intermediate annular chamber 19, and contaminants in the interior interface passage 18 will generally remain stationary due to the barrier the unitizing ring 32 creates to ingress of contaminants into the primary bearing 5 environment. Contaminants collected in the intermediate annular chamber 19, in the interior interface passage 18, and in the exterior interface passage 17 will be expelled from the improved bearing isolator 12 through the exterior interface passage 17 when the conveyor roller shell 1 (and subsequently, the rotor 14) is again put into a rotational state.

Figure 5A:
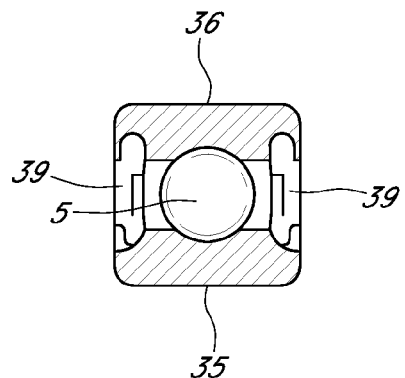
FIG. 5A is a side view of a primary bearing element with seals.
Figure 5B:
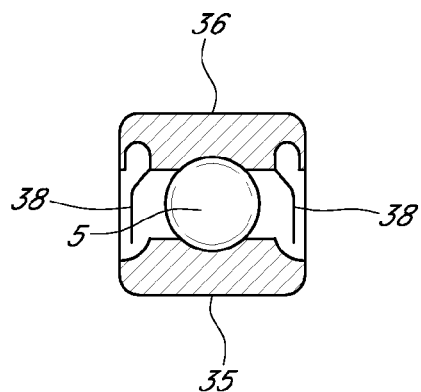
FIG. 5B is a side view of a semi-shielded primary bearing element.
Figure 5C:
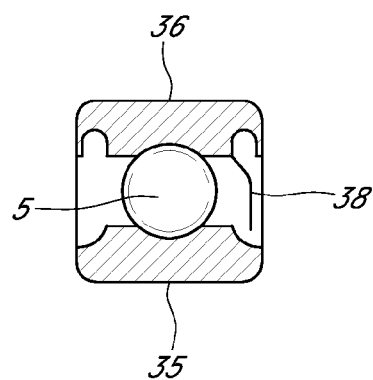
FIG. 5C is a side view of a fully-shielded primary bearing element.

FIGS. 5A-5C illustrate another operational feature of the present art. FIG. 5A is a side view of a sealed primary bearing 5 with contact seals. This type of primary bearing 5 is typically constructed with a Teflon™ or rubber lip seal that contacts the inner bearing race 35 and outer bearing race 36 of the primary bearing 5. The primary bearing 5 is typically packed with heavy grease. The primary bearing seal 39 is fashioned to seal the primary bearing 5 from the external environment and retain the grease within the primary bearing 5. Compared to semi-shielded bearings (shown in FIG. 5B) or fully-shielded bearings (shown in FIG. 5C), the frictional loses incurred by using sealed bearings are higher. The prior art conveyor rollers 40 as shown in FIG. 1, 1A and 2 typically employ sealed primary bearings 5 because the bearing seals of the prior art are do not adequately isolate the primary bearing 5 from contaminants. However, any type of prior art primary bearing 5 may be used with the improved bearing isolator 12 become of its superior isolation and contaminant exclusion capabilities. Therefore, the improved bearing isolator 12 reduces operating costs by reducing the instances of primary bearing 5 failure; and since the improved bearing isolator facilitates the use of primary bearings that require less energy to rotate because of fewer frictional losses, the energy costs are reduced.

The bearing sealing mechanism of the conveyor rollers 40 of the prior art may be replaced with the present art improved bearing isolator 12. Replacing the prior art sealing mechanism typically used with the primary bearings 5 with improved bearing isolators 12 will provide lube containment shields that will not wear or degrade in use. FIG. 5B is a side view of a semi-shielded primary bearing 5 as may be used in the present art. FIG. 5C is a side view of a fully-shielded primary bearing 5 as may be used in the present art. Replacing the prior art primary bearing 5 lube retention and contaminant exclusion seals (or contact seals, as explained above) with lube retention shields (or improved bearing isolators 12, as explained above) reduces system energy use through reduction in frictional losses.

The improved bearing isolator 12 is a further improvement upon the prior art conveyor roller bearing sealing mechanisms because the improved bearing isolator 12 may act as a secondary sleeve bearing assembly to the primary bearing 5 in the event the primary bearing 5 should fail and collapse. The angled stator exterior end face 15 of the improved bearing isolator 12 increases internal axial surface area available between the stator 13 and rotor 14 of the improved bearing isolator 12, which reduces pressure between the stator 13 and rotor 14 when those elements are in contact with one another. However, as previously noted, under normal operating parameters respective elements of the stator 13 are not in contact with corresponding elements of the rotor 14. The present improved bearing isolator 12 may serve as an emergency sleeve-type or journal bearing and serve to mitigate overheating of the failed primary bearing 5. However, unmonitored operation in this mode is not recommended; and in the event of primary bearing 5 failure it is recommended that the primary bearing 5 be replaced as soon as possible. During temporary operation as an emergency sleeve or journal bearing, the ensuing heat conducted from the primary bearing 5 to the rotor interior end face 16 and through the improved bearing isolator 12, or the heat generated between the stator 13 and rotor 14 may liquefy the grease stored in the improved bearing isolator 12; thereby allowing the grease to lubricate the surfaces between the stator 13 and rotor 14 that may come into contact due to primary bearing 5 failure. The lubrication of these surfaces during emergency operation should greatly extend the useful life of the improved bearing isolator 12 in the event of primary bearing 5 failure. Again, unmonitored operation in this mode is not recommended.

FIGS. 6 and 7 illustrate cross-sectional views of another embodiment of the improved bearing isolator 12 as disclosed herein. As illustrated in FIGS. 6 and 7, the external contaminant entrance to the exterior interface passage 17 may be axially positioned between an inner side of stator 31 and an inner side of rotor 30, which entrance is referred to in this embodiment as the axial interface passage 29. As illustrated in FIGS. 6 and 7, the axially positioned external contaminant entrance to the axial interface passage 29 is also positioned to face an axially opposite direction from the stator exterior end face 15. FIG. 6 demonstrates one embodiment in which the stator exterior end face 15 is modified to allow for a sensor to be placed therein via a sensor port 44. The sensor may be of any type known to those skilled in the art for indicating an increase in temperature of the improved bearing isolator 12, particularly during operation as an emergency sleeve bearing, as described above. Examples of sensors include electronic transducers, transmitters, and thermal sensing conductors or connectors as exemplified by U.S. Pat. No. 4,647,710, previously referenced herein. Sensors designed to monitor other operational parameters, such as vibrations, frequencies, or other pertinent information may also be inserted into a sensor port 44, and the type of sensor in no way limits the scope of the present invention. Because the stator exterior end face 15 is typically not rotating when affixed to a non-rotating shaft 2, the position of the sensor port 44 may be stationary, which allows for interconnection of the improved bearing isolators 12 in a network. This network facilitates automation and integration with a dedicated data processing system for a continuous or semi-continuous monitoring and alert system, which is not shown herein, but which systems and networks are known to those skilled in the art. The adjacent positioning of an improved bearing isolator 12 in relation to primary bearing 5 and the cooperative engagement of the rotor 14 with the bearing housing 3 (which is also cooperatively engaged with the primary bearing 5) promotes transmission of heat from the interior of the improved bearing isolator 12 to the exterior of the improved bearing isolator 12, where the sensor may be located.

FIG. 7 provides a cross-sectional view of another embodiment of the improved bearing isolator 12 as disclosed herein wherein the available axial engagement surface area 26 between the stator 13 and rotor 14 has been further increased along the interior interface passage 18. Again, the angled stator exterior end face 15 facilitates increased available axial engagement surface area 26 to support the improved bearing isolator 12 in the event of degradation of the primary bearing 5. As with the other embodiments of the improved bearing isolator pictured and disclosed herein, in the embodiment shown in FIG. 7, during normal operation there should be no contact between the stator 13 and rotor 14 along the available axial engagement surface area 26 or any other interface portions between the stator 13 and the rotor 14. When the improved bearing isolator 12 is used in combination with a primary bearing 5, such as found in a conveyor roller 40, the improved bearing isolator 12 may serve as an emergency sleeve or journal bearing as described above, and the increased available axial engagement surface area 26 may prolong the useful life of the improved bearing isolator 12 during such operation. During operation, the intermediate annular chamber 19 may be filled with long-lasting (preferably synthetic) grease, as known to those practiced in the art. As is also obvious to those skilled in the art, the grease may be filled at the time of initial assembly or after initial assembly of the improved bearing isolator 12 through the use of an external grease zerk 45 fitting employing a grease passage 46 in the stator 13 running from the stator exterior end face 15 into the intermediate annular chamber 19.

In another embodiment not pictured herein, the improved bearing isolator 12, as disclosed herein, may be used in combination with a vapor blocking ring component such as that described in U.S. Pat. No. 6,419,233, which is incorporated by reference herein, so as to prevent possible ingress of vapor contamination into the primary bearings 5.

Figure 8:
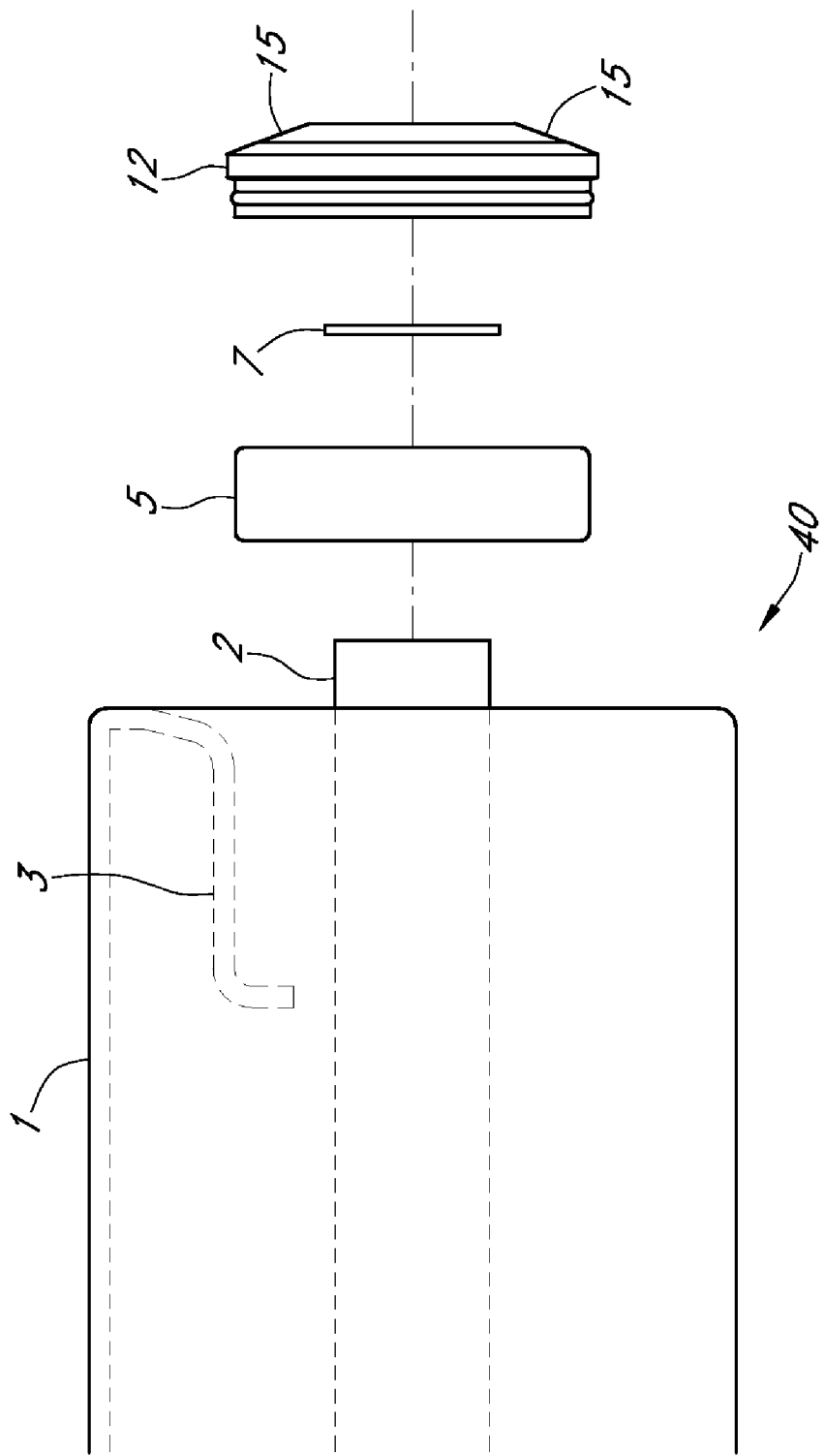
FIG. 8 provides an exploded view of the arrangement of the improved bearing isolator as disclosed herein for use in combination with a conveyor roller.

FIG. 8 provides an exploded view of one end of an arrangement of the improved bearing isolator 12 as disclosed herein for use in combination with a conveyor roller 40 wherein the improved bearing isolator 12 serves as both an improved bearing isolator 12 and end cap (similar to the function of the stone guard 8A as taught by the prior art). An improved conveyor roller 40, as shown in FIG. 8, has a conveyor roller shell 1 with first and second ends. A shaft 2 also having first and second ends is inserted through and surrounded by the conveyor roller shell 1. As shown, a first bearing housing 3 is positioned within the conveyor roller shell 1 at the first end of the conveyor roller shell 1. Although not shown, a second bearing housing 3 is also placed within the conveyor roller shell and positioned at the second end (opposite the first end) of the conveyor roller shell 1, which is a mirror image of the arrangement shown in FIG. 8 and configured in the same manner as that described for the end shown in FIG. 8. A primary bearing 5 is then inserted within the first bearing housing 3 and cooperatively affixed with the shaft 2 adjacent the first end of the shaft 2. Although not shown, a second primary bearing 5 is then inserted within the second bearing housing 3 and also cooperatively engaged with the shaft 2 adjacent the second end of the shaft 2. A first improved bearing isolator 12, having primary bearing 5 isolation functionality, has a stator 13 (as explained in more detail above) affixed to the shaft 2 and a rotor 14 affixed to the conveyor roller shell 1, both of which are positioned proximate the first end of the shaft 2. The first improved bearing isolator 12 is positioned adjacent and axially outward with respect to the primary bearing 5. In the embodiment shown in FIG. 8, the first improved bearing isolator 12 isolates the first primary bearing 5 from contaminant exposure but allows heat transmission from the primary bearing 5 to the stator interior end face 16, through the improved bearing isolator 12 to the stator exterior end face 15. A second improved bearing isolator 12, not shown, also has a stator 13 affixed to the shaft 2 and a rotor affixed to the conveyor roller shell 1, both of which are positioned proximate the second end of the shaft 2. In the same manner as for the first end of the shaft 2, the second primary bearing 5 is positioned axially inward of, and adjacent to, the second improved bearing isolator 12 to isolate the second primary bearing 5 from contaminant exposure, while allowing transmission of heat from the primary bearing 5 to the rotor interior end face 16, through the improved bearing isolator 12 to the stator exterior end face 15. Because the stator exterior end face 15 is external to the elements of the conveyor roller 40, the temperature of the stator exterior end face 15 may easily be observed and detected.

Figure 9:
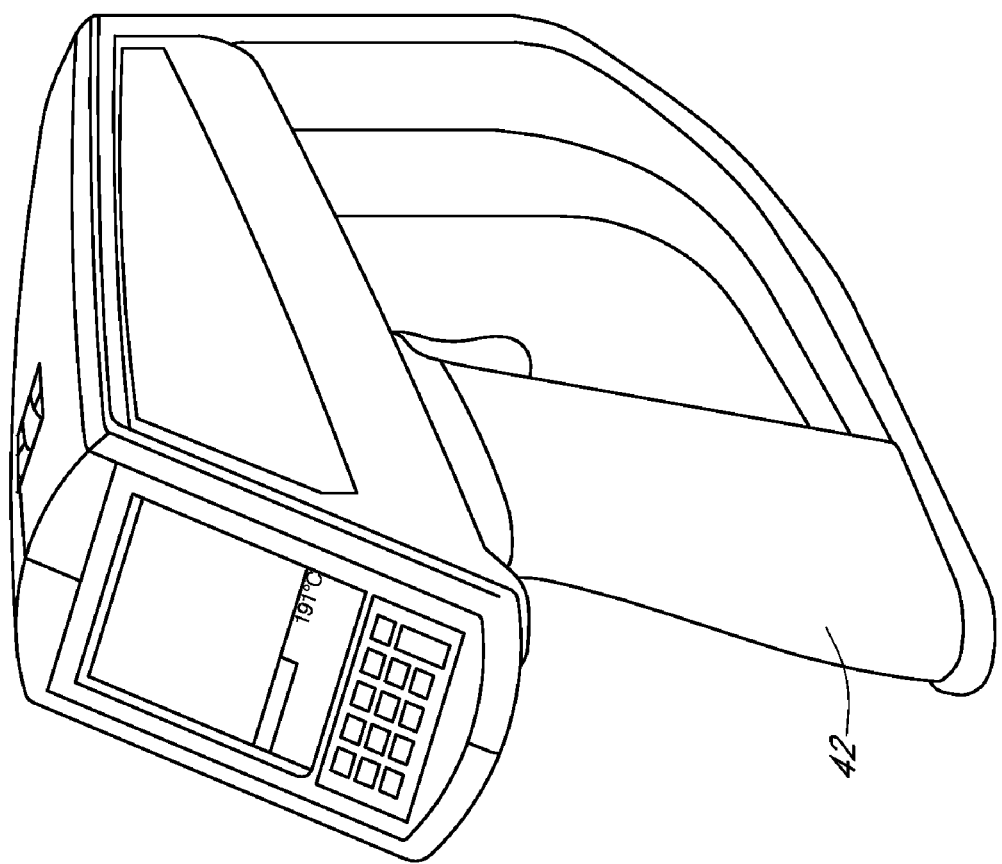
FIG. 9 is a perspective view of a thermal scanner as taught by the prior art that may be used in combination with the present art for an improved method of monitoring bearing systems.
Figure 10:
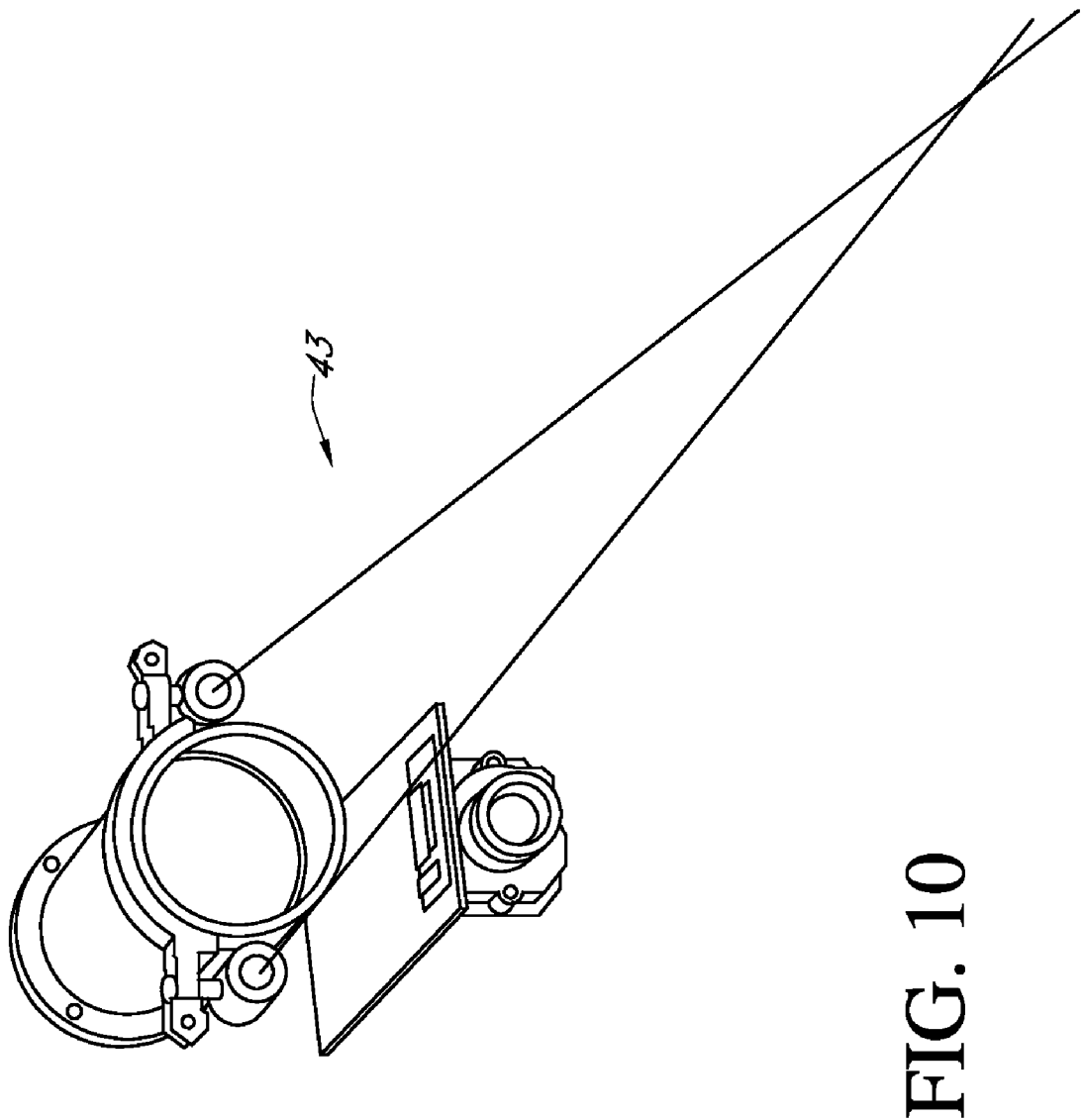
FIG. 10 is a perspective view of an IR camera as taught by the prior art.

FIG. 9 is a perspective view of a thermal scanner 42 as taught by the prior art, and FIG. 10 is a view of an IR camera 43, both of which may be used in combination with the present art for an improved method of monitoring bearing systems such as those claimed and disclosed herein.

One embodiment of a monitoring system and method would include first positioning a primary bearing 5 adjacent a bearing isolator 12 in a manner similar to that shown in FIG. 8, wherein the surface of the bearing isolator 12 that is not adjacent the primary bearing 5 is fashioned with a stator exterior end face 15 that may function as an indicator surface. In this method for monitoring, the adjacent arrangement of the primary bearing 5 and the bearing isolator 12 promotes thermal energy transfer from the primary bearing 5 to the rotor interior end face 16, through the bearing isolator 12, and finally to the stator exterior end face 15. A detector means may then be positioned at a range that allows collection of data from the stator exterior end face 15. The detector means may be a thermal scanner 42, IR camera 43, or any other detector means known to those skilled in the art. The stator exterior end face 15 may communicate other specific operating parameters of the primary bearing 5 or a plurality of operating parameters, such as vibration frequencies and/or amplitudes or other parameters indicating the operational state of the primary bearing 5.

Figure 11:
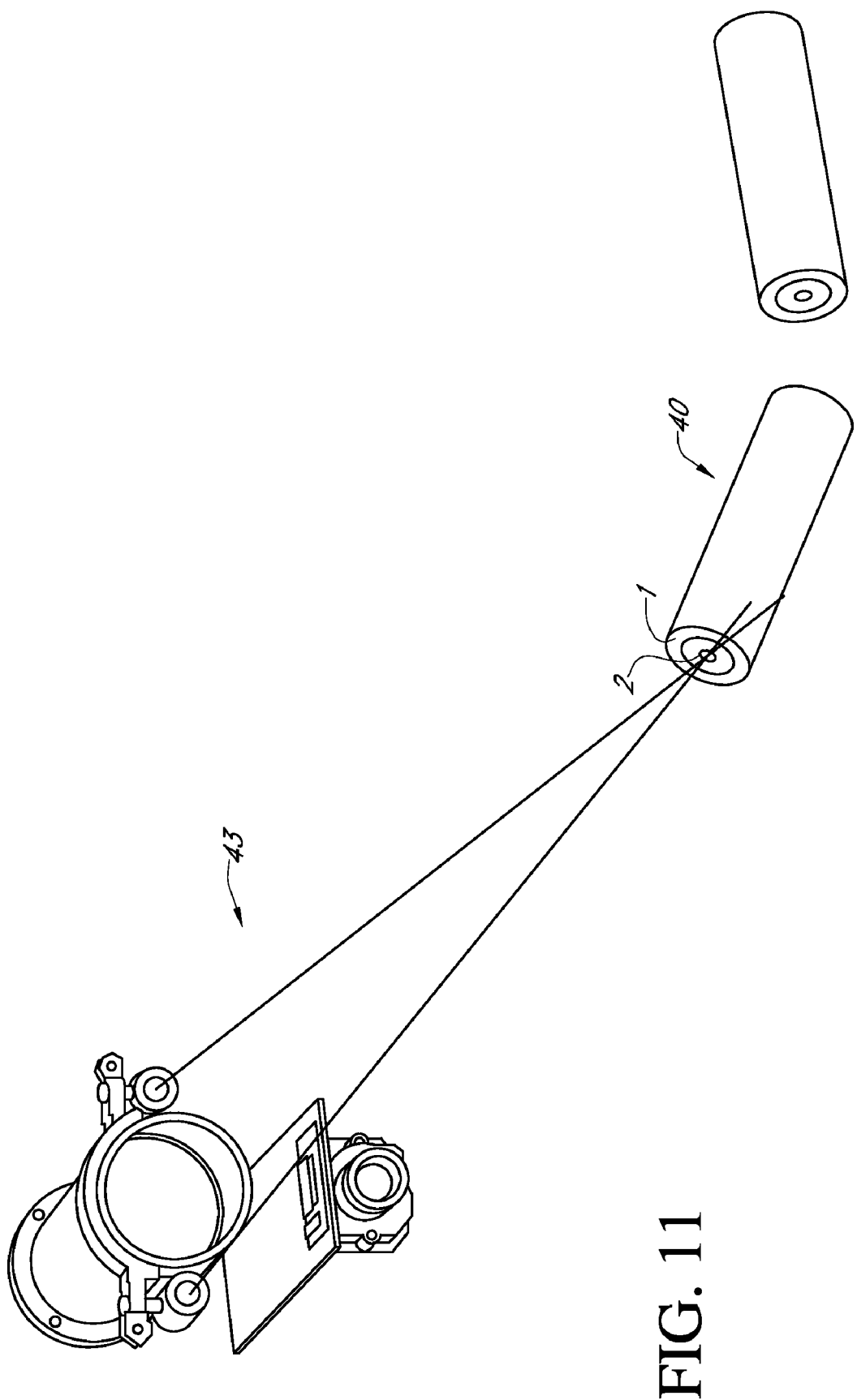
FIG. 11 is a perspective view of an IR camera as taught by the prior art arranged in combination with the present art for an improved method of monitoring bearing systems.

The detector means would then be monitored during operation of the conveyor roller 40 to detect any deleterious change in the operation of the primary bearing 5 as reflected by energy accumulation at the stator exterior end face 15, or other relevant information that provides insight to the operational parameters of the primary bearing 5. Deleterious changes in the operation of the primary bearing 5 may be indicated by accumulation of excess heat or vibration at the stator exterior end face 15. The preceding system could incorporate a single mobile thermal scanner or IR camera, or any other portable heat sensing device, operated by a human as available. FIG. 11 shows an IR camera 43 positioned so that the IR camera 43 is capable of detecting the temperature of the bearing isolator 12. This arrangement could be replicated for each bearing isolator 12 on each conveyor roller 40, or different detector means could be employed for different bearing isolators 12, depending on the detector means that best serves a particular application.

In this method, the detector means would then be monitored during operation of the conveyor roller 40 to detect any deleterious change in the operation of the primary bearing 5 as reflected by energy accumulation at the stator exterior end face 15. Deleterious changes in the operation of the primary bearing 5 may be indicated by accumulation of excess heat or vibration at the stator exterior end face 15. The preceding system could incorporate a single mobile thermal scanner or IR camera, or any other portable heat sensing device, operated by a human or automated, as available.

Figure 12:
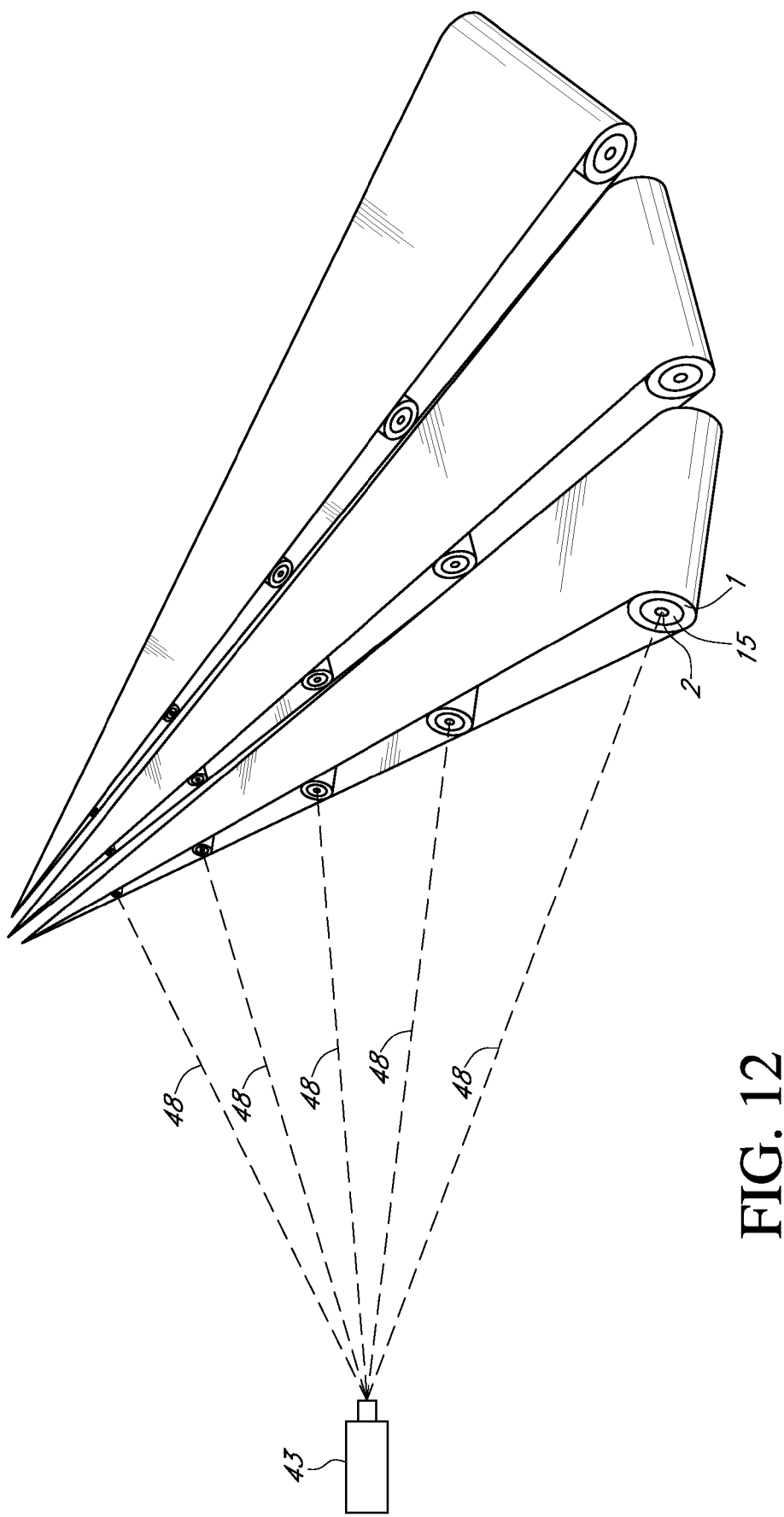
FIG. 12 is a perspective view of an IR camera as taught by the prior art arranged in combination with the present art to facilitate monitoring a plurality of primary bearings.

In another embodiment of this method, at least one detection means could be positioned within range of a plurality of stator exterior end faces 15 and programmed to pan and scan in a semi-autonomous manner at a pre-selected frequency. FIG. 12 provides one view of this embodiment of the method, wherein the detection means is an IR camera 43. In the embodiment shown in FIG. 12, the scan path 47 of the IR camera 43 is broad enough to monitor five bearing isolators 12. As shown by the dashed lines in FIG. 12, the IR camera 43 is positioned so that a line of sight 48 may be established between the IR camera 43 and the stator exterior end faces 15 of five bearing isolators 12. Alternatively, the scan path 47 could be programmed so that the IR camera 43 moved in two (or even three) dimensions so that it is capable of monitoring additional bearing isolators 12 and the scan path 47 may be considerably more complicated than that shown in FIG. 12. The detecting means would be in communication with either an alarm (not shown) to signal an operator of deleterious conditions, or the detecting means would be in communication with a user interface (not shown) that displays real-time information to the operator regarding the operating parameters the detecting means is configured to detect. The preceding monitoring and indicator system and method may also be networked allowing connection with a data processing system (not shown) to allow data collection, monitoring, alerts and even controlled shutdowns of the conveyor system as necessitated by operating conditions.

It should be noted that the present invention is not limited to the specific embodiments pictured and described herein, but is intended to apply to all similar methods for monitoring relevant operational parameters of primary bearings 5, conveyor systems, thermal accumulation related to primary bearing 5 failure, or deterioration of a bearing or conveyor system during operation. Accordingly, modifications and alterations from the described embodiments will occur to those skilled in the art without departure from the spirit and scope of the present invention.

The invention claimed is:

1. A method for monitoring a bearing of a conveyor roller comprising:
   a. positioning a non-contacting bearing isolator adjacent said bearing wherein said non-contacting bearing isolator comprises:
      i. a stator secured to a shaft; and,
      ii. a rotor secured to said conveyor roller, wherein the stator has a stator exterior end face axially distal from said bearing secured to said shaft, wherein said stator and said rotor cooperate to form a non-contacting labyrinth seal between said bearing and an atmosphere axially distal said stator exterior end face, said labyrinth seal comprising;
         1. an exterior interface passage;
         2. an intermediate annular chamber;
         3. an interior interface passage; and
         4. an immediate interface passage between said stator and said rotor;
   b. allowing at least one operational parameter of said bearing to be communicated to said non-contacting bearing isolator; and
   c. positioning a monitor a predetermined distance from said non-contacting bearing isolator so that said monitor is capable of monitoring said at least one operating parameter of said bearing by detecting at least one operating parameter of said bearing isolator.

2. A method for monitoring a bearing of a conveyor roller comprising:
   a. positioning at least one non-contacting bearing isolator adjacent said bearing wherein said non-contacting bearing isolator comprises:
      i. a stator secured to a shaft, wherein said stator includes a stator exterior end face;
      ii. a sensor port fashioned in said stator exterior end face; and
      iii. a rotor secured to said conveyor roller, wherein the stator has a stator exterior end face axially distal from a bearing secured to said shaft, wherein said stator and said rotor cooperate to form a non-contacting labyrinth seal between said bearing and an atmosphere axially distal said stator exterior end face, said labyrinth seal comprising;
         1. an exterior interface passage;
         2. an intermediate annular chamber;
         3. an interior interface passage; and
         4. an immediate interface passage between said stator and said rotor;
   b. allowing at least one operational parameter of said bearing to be communicated to said non-contacting bearing isolator; and
   c. positioning a sensor in said sensor port so that said sensor is capable of sensing said at least one operating parameter of said bearing.

3. The method for monitoring a bearing according to claim 2 wherein said sensor is further defined as a thermal energy sensor.

4. The method for monitoring a bearing according to claim 2 wherein said sensor is further defined as a device operable to detect and measure vibrational information.

5. The method for monitoring a bearing according to claim 2 wherein said sensor communicates the value of said at least one operating parameter to a user interface.

6. The method for monitoring a bearing according to claim 2 further comprising a plurality of bearings and a plurality of sensors.

7. The method for monitoring a bearing according to claim 6 wherein said plurality of sensors are in communication with each other.

8. The method for monitoring a bearing according to claim 2 wherein said at least one operational parameter is chosen from a group comprised of thermal energy, vibration frequency, vibration amplitude, rotational speed, rotational resistance, axial or radial displacement of said shaft, axial or radial displacement of said conveyor roller, and wear on said bearing.

9. A method for monitoring a bearing comprising:
   a. positioning at least one non-contacting bearing isolator adjacent a bearing on a piece of rotating equipment so that at least one operating parameter of said bearing is communicated to said bearing isolator; and,
   b. positioning an energy detector within range of said bearing isolator so that said energy detector is able to monitor said at least one operating parameter of said bearing by detecting at least one operating parameter of said bearing isolator, wherein said energy detector is further defined as an IR camera.

10. A method for monitoring a plurality of bearings comprising:
   a. positioning at least one non-contacting bearing isolator adjacent at least one of a plurality of bearings on a piece of rotating equipment so that at least one operating parameter of said bearings is communicated to said bearing isolator;
   b. positioning a plurality of energy detectors within range of said bearing isolator so that at least one of said plurality energy detectors is able to monitor said at least one operating parameter of said at least one of a plurality of bearings by detecting at least one operating parameter of said bearing isolator, wherein said plurality of energy detectors are in communication with each other.

* * * * *